US007509935B2

(12) United States Patent
Vincer et al.

(10) Patent No.: US 7,509,935 B2
(45) Date of Patent: Mar. 31, 2009

(54) ENGINE COVER AND METHOD

(75) Inventors: Tyler R. Vincer, Elmhurst, IL (US); Abhilash R. Pamulaparthy, Cary, NC (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/555,265

(22) Filed: Oct. 31, 2006

(65) Prior Publication Data

US 2008/0098979 A1 May 1, 2008

(51) Int. Cl.

| | |
|---|---|
| ***F02F 7/00*** | (2006.01) |
| ***F01M 11/00*** | (2006.01) |
| ***F16N 31/00*** | (2006.01) |

(52) U.S. Cl. ............................. 123/195 C; 123/196 R; 123/198 E; 184/106

(58) Field of Classification Search ............. 123/195 C, 123/195 R, 198 E, 196 R, 196 S, 195 S; 180/69.2, 180/69.23; 184/6.5, 106
See application file for complete search history.

(56) References Cited

U.S. PATENT DOCUMENTS

| | | | | |
|---|---|---|---|---|
| 2,536,351 | A * | 1/1951 | Bureau | 49/473 |
| 4,226,214 | A * | 10/1980 | Palazzetti | 123/2 |
| 5,275,249 | A * | 1/1994 | Nelson | 180/69.2 |
| 2005/0019590 | A1* | 1/2005 | Josefsson | 428/457 |
| 2007/0261661 | A1* | 11/2007 | Fogolini | 123/198 E |

* cited by examiner

*Primary Examiner*—Michael Cuff
*Assistant Examiner*—Ka Chun Leung
(74) *Attorney, Agent, or Firm*—Jack D. Nimz; Jeffrey P. Calfa

(57) ABSTRACT

An engine cover (400), such as a valve cover (700) or an oil pan (400), includes a skeleton structure (402) that may have a plurality of ribs (406) and at least one opening. At least one panel (404) is configured to fit in the at least one opening, and is operably connected to the skeleton structure (402). A seal (424) is located between the at least one panel (404) and the skeleton structure (402). The plurality of ribs (406) defines a plurality of channels (802) located around the at least one or more openings. Each panel (404) is held to the skeleton structure (402) by the plurality of channels (802).

17 Claims, 6 Drawing Sheets

- PRIOR ART -

- PRIOR ART -

- PRIOR ART -

- PRIOR ART -

- PRIOR ART -

- PRIOR ART -

ENGINE COVER AND METHOD

FIELD OF THE INVENTION

This invention relates to covers for internal combustion engines, including but not limited to oil pans that attach to a crankcase of an internal combustion engine and valve covers that attach to an engine cylinder head.

BACKGROUND OF THE INVENTION

Internal combustion engines use oil for lubrication and cooling of various internal components. Oil is typically circulated through various engine components with the help of an oil pump. Engine oil pumps are usually driven by gears that are connected to a rotating engine component, for example, a crankshaft, or a camshaft.

A typical engine oil pump has a sump accumulator for oil. A pool of oil is usually collected in a reservoir that is near a low point of the engine. Oil circulated by the oil pump through engine components usually collects back into the oil reservoir. Engines typically have their oil reservoirs in cavities contained in separate pieces that are connected to the engine's crankcase. These pieces, or oil pans, usually sealably connect to the bottom of a crankcase.

Oil pans for internal combustion engines tend to be large components that cover an entire lower opening of an engine's crankcase. As such, they usually have large flat surfaces that span the width and length of the engine. These large flat surfaces often tend to resonate during operation of the engine, and either generate or relay noise during operation of the engine. Noise generation or transmission is usually an undesired attribute to an engine's operation, and there have been various methods used in the past to dampen and/or reduce the noise coming from an engine's oil pan.

One method used in the past for noise reduction of oil pans, is use of metal-polymer-metal (MPM) sheets. An MPM sheet material, for example, a material available in the market under the trade name PCX-9 Quiet Steel™ manufactured by MSC Laminates and Composites Inc., may be made of metal outer skins and a 0.001" (0.025 mm) thick viscoelastic polymer core. One disadvantage of MPM materials is their shapeability and flexibility in designing their shapes because most MPM oil pans are made by use of a drawing process. MPM oil pans do not lend themselves well for situations where there is little space available for packaging the oil pan around surrounding vehicle components because of the limitations to their shape.

In situations where there is little space available for packaging an oil pan, many engines designs employ metal castings for forming a more intricate shape for the oil pan. Cast-metal oil pans tend to be heavier and more expensive to manufacture, and offer little sound insulation because of their rigidity. Past methods used for sound insulation of cast oil pans have included iso-mounting the oil pan to the engine, covering the oil pan with a sound absorbing material, or trying to design-in less flat surfaces. All these methods have been partly effective in their sound insulating effectiveness, but add cost and complexity to the engine design.

Accordingly, there is a need for an oil pan for an internal combustion engine that has good sound insulation or absorption characteristics, and is flexible in its design shape capabilities. Similarly, there is a need for a valve cover for an internal combustion engine that has good sound insulation or absorption characteristics, and is flexible in its design shape capabilities.

SUMMARY OF THE INVENTION

A hybrid engine cover is disclosed herein. The hybrid engine cover advantageously combines the design flexibility of a cast component, with the low weight, cost, and superior sound dampening attributes of a composite material, for example, an MPM sheet material. The engine cover includes a skeleton structure that may have a plurality of ribs and at least one opening. In some instances, for example in a valve cover application, a single rail may make up the skeleton. At least one panel is configured to fit in the at least one opening, and is operably connected to the skeleton structure. A seal is located between the at least one panel and the skeleton structure. The plurality of ribs defines a plurality of channels located around the at least one or more openings. Each panel is held to the skeleton structure by the plurality of channels.

An internal combustion engine includes a crankcase connected to a cylinder head. A first engine cover has a rim flange that has a first channel, connected to the cylinder head, and a formed body panel connected to the rim flange. The formed body panel defines an internal volume. An isolative material is located between the rim flange and the formed body panel. A second engine cover includes a frame structure that is connected to the crankcase. The frame structure defines at least one opening that is surrounded by a second channel. The second engine cover also includes at least one flat panel that is constructed to fit within the second channel. A sealant material in the second channel seals and connects the at least one flat panel with the frame structure. The first engine cover and the second engine cover are capable of dampening noise that is generated when the internal combustion engine is in operation.

A method for isolating an engine-cover from vibration includes the step of forming a frame that includes a plurality of rails into an outline shape, having at least one opening. At least one panel is fit into the at least one opening by being located in a channel. The channel is formed in the frame and surrounds the at least one opening. A sealant material may be applied to the channel either before or after insertion of the at least one panel therein. The sealant material is advantageously located between the at least one panel and the frame. The at least one panel is secured to the frame such that the at least one opening is completely covered and sealed.

DESCRIPTION OF A PREFERRED EMBODIMENT

Figure 1:
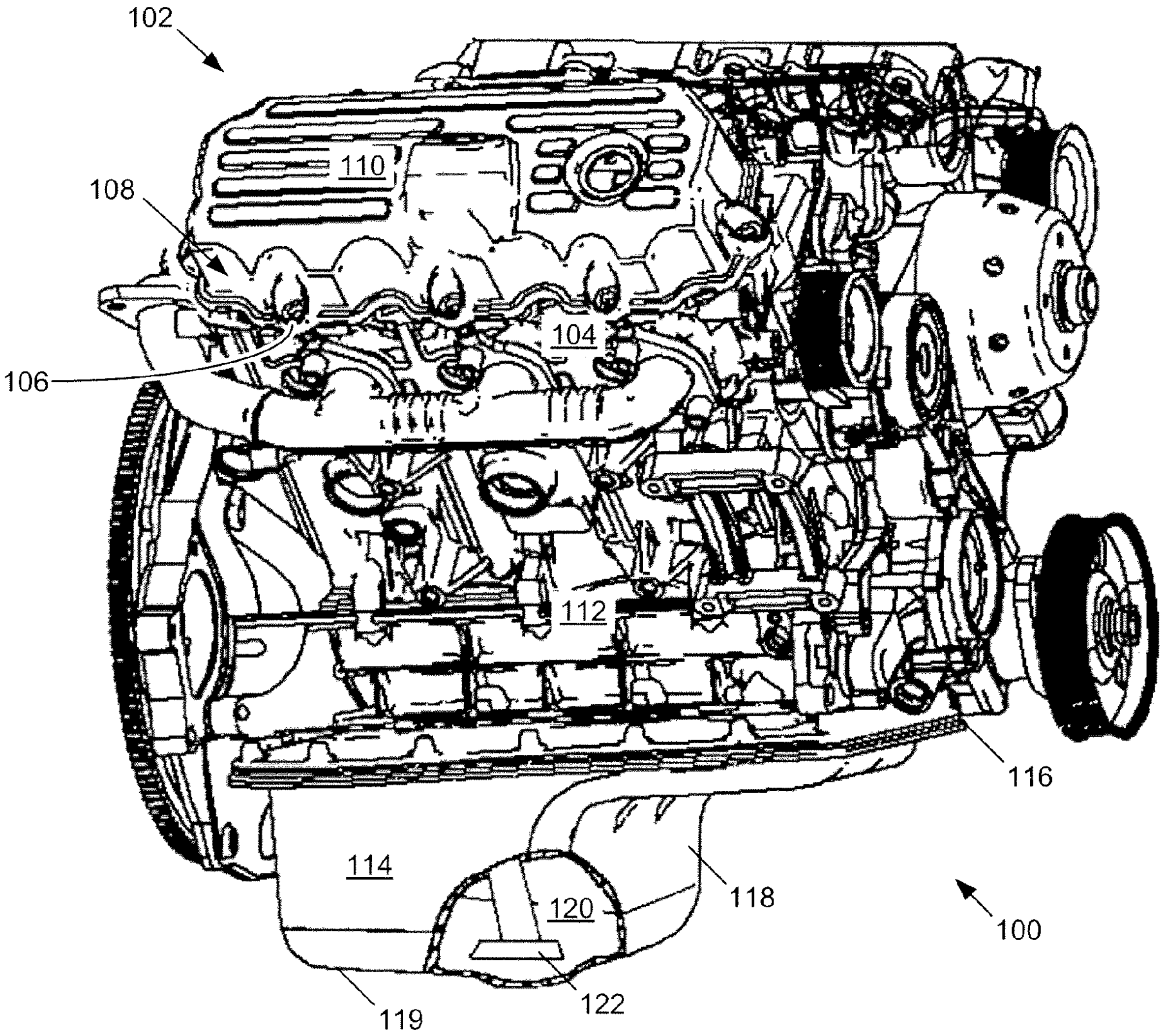
FIG. 1 is an outline view in partial cross section of an internal combustion engine having covers made in accordance with the invention attached thereon.

The following describes engine covers, such as an engine oil pan or a valve cover, used in internal combustion engines. An oil pan, valve cover, or any type of engine cover in accordance with the invention advantageously accommodates design flexibility and may have built-in noise dampening and reduction characteristics. An internal combustion engine 100 having V-cylinder configuration is shown in FIG. 1. The engine 100 has a valve cover 102 connected to a cylinder head 104. The valve cover 102 has an interface rim 106 along an interface to the cylinder head 104, a side wall 108 extending along an entire perimeter of the rim 106, and a top panel 110. The engine 100 has two valve covers because its cylinders are arranged in a V-configuration. Other engines having, for example, their cylinders arranged in an I-configuration may only have one valve cover.

The cylinder head 104 is connected to a crankcase 112. The crankcase 112 has the cylinder head 104 connected to an upper portion thereof, and has an oil pan 114 connected to a lower portion thereof. The oil pan 114 has a connection rim 116 substantially along the entire lower portion of the crankcase 112. The oil pan 114 has a reservoir wall 118 and a bottom panel 119 that enclose a reservoir volume or sump 120. The reservoir volume 120 may be used to collect a pool of oil used by the engine 100 during operation for lubrication, hydraulic operation, and/or cooling of various engine components during operation. Oil from the reservoir 120 may be drawn into an engine pump (not shown) through a pick-up tube 122 that extends into the sump 120.

During operation of the engine 100, noise is generated within the crankcase, and other locations, which may be transmitted through the valve cover(s) 102 and the oil pan 114. This noise has the potential of amplification through resonant motion of the walls 108 and 118, or the panels 110 and 119. It is advantageous to use noise absorbing and vibration dampening materials in the construction of the valve cover(s) 102 and the oil pan 114.

Figure 2A:
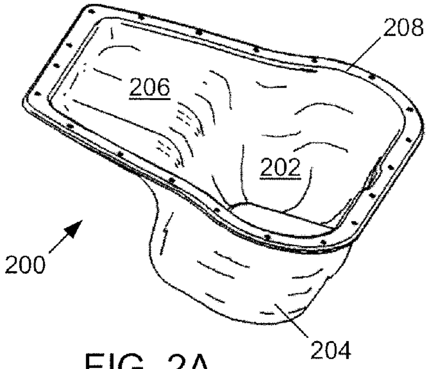
FIGS. 2A through 2C are various views of a prior art oil pan.
Figure 2B:
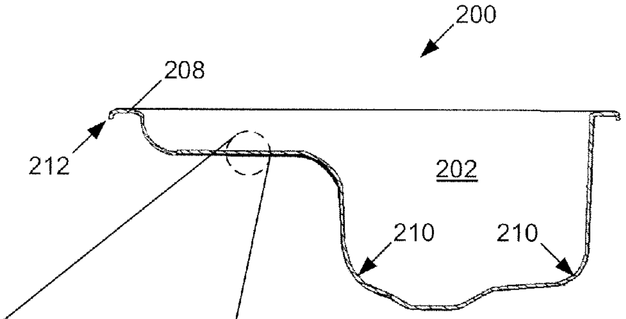
Figure 2C:
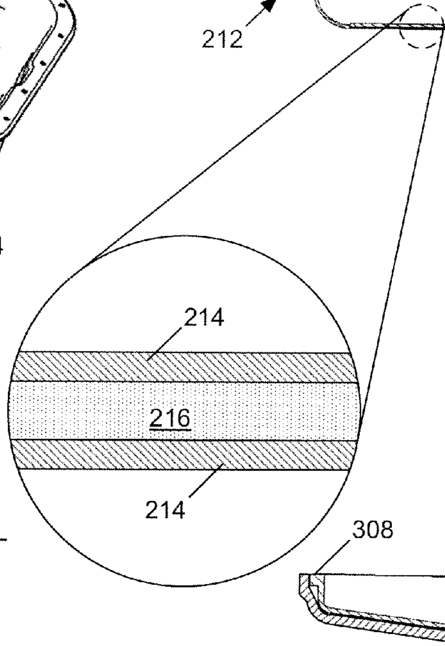

Use of MPM materials in both oil pans and/or valve covers of engines is known for noise dampening. A typical MPM oil pan 200, shown as an example, is presented in isometric view in FIG. 2A and in cross-section in FIG. 2B. A detail cross-section of an MPM material used for construction of the oil pan 200 is shown in FIG. 2C. The oil pan 200 has a reservoir volume 202 enclosed on five sides by a formed MPM sheet 204. The oil pan 200 may have a ledge 206 that reduces the volume 202 and typically provides external clearance to engine or vehicle components, such as vehicle suspension or axle systems. An interface rim 208 surrounds an open end of the oil pan 200 and is used to connect to and seal with an engine's crankcase as described above.

The reservoir volume 202 is typically formed by a deep-drawing operation performed on the MPM sheet 204, which is initially flat. Dies (not shown) that are appropriately shaped may engage a flat sheet of MPM material, and plastically deform it to form the oil pan 200. Manufacturing and engineering considerations for this operation often dictate aspects of the shape of the resultant oil pan 200. For example, an internal radius 210 along a bottom of the reservoir 202 may have to be increased to accommodate separation of the sheet 204 from the dies when the oil pan is formed. Similarly, most other radii in the oil pan 200 may have to be enlarged to allow separation of the sheet 204 from the dies and avoid material folding and collapsing during the deep-drawing operation. Moreover, an edge along the rim 208 may require a turning-over operation to create a ridge 212 that is adjacent to the rim 208 that provide both structural integrity and a sealing surface to the oil pan 200. All these features detract from the design flexibility of the oil pan 200, and are wasteful of packaging space near or around the oil pan 200.

Design limitations in formed MPM components are inherent to the material used. A detailed cross-section of a typical MPM material is shown in FIG. 2C. A pair of metal sheets 214 may be bonded and connected to either side of a thick viscoelastic polymer core 216. The metal sheets 214 are capable of undergoing a deep-drawing forming operation, but also have inherent limitations in their shapeability, as described above. The thick viscoelastic polymer core 216 is able to advantageously dampen vibrations between the sheets 214, thus dampening the noise transmission characteristics of the MPM material.

Figure 3A:
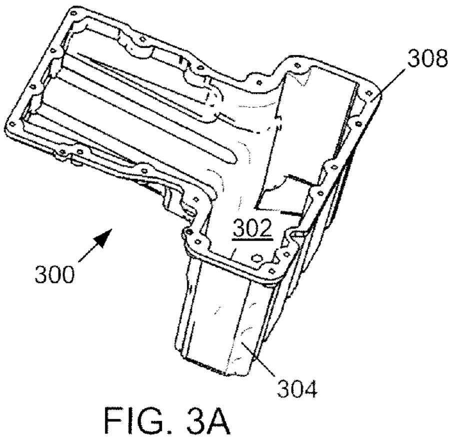
FIGS. 3A through 3C are various views of a prior art cast oil pan having a sound shield attached thereon.
Figure 3B:
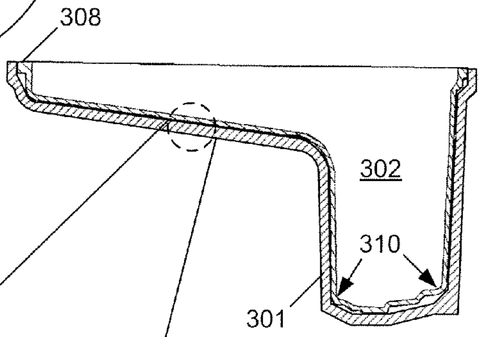
Figure 3C:
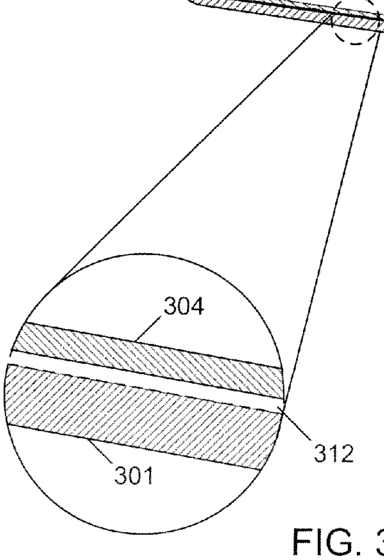

When a specific engine application cannot accommodate the design limitations inherent with the use of an MPM material, use of a cast oil pan 300 may be implemented. The cast oil pan 300 is shown in isometric view in FIG. 3A and in cross sectional view in FIG. 3B. A detailed cross-section of an interface between the cast oil pan 300 and a noise shield 301 attached thereon is shown in FIG. 3C. The oil pan 300 has a reservoir volume 302 enclosed on five sides, an interface rim or flange 308 surrounding an open end of the oil pan 300 that is used to connect to and seal with an engine's crankcase as described above.

The reservoir volume 302 is typically formed by a casting operation performed using a metal material 304, typically an aluminum alloy. Molds (not shown) that are appropriately shaped may form the metal 304 in a molten state into a desired shape before it cools. 300. One disadvantage of cast metal oil pans is the cost and weight added to an engine system using them. Additionally, metal castings in general are rigid structures that both transmit and may even amplify a noise signal.

The noise shield 301 may cover an exterior of the oil pan 300 to help dampen noise. The shield 301 may be connected to the oil pan 300 with adhesives or fasteners. The shield 301 may be made of a polymer foam or viscoelastic material that is appropriate for noise dampening. Often, an air gap 312 may form between the shield 301 and the metal 304. This air gap 312 may trap foreign material, for example road debris or water.

While MPM components provide satisfactory noise cancellation, they have design shapeability limitations. Cast components, while providing design shapeability flexibility, are not suited for adequate noise cancellation. These and other limitations for engines using cast or MPM oil pans and/or valve covers may be avoided as follows.

Figure 4:
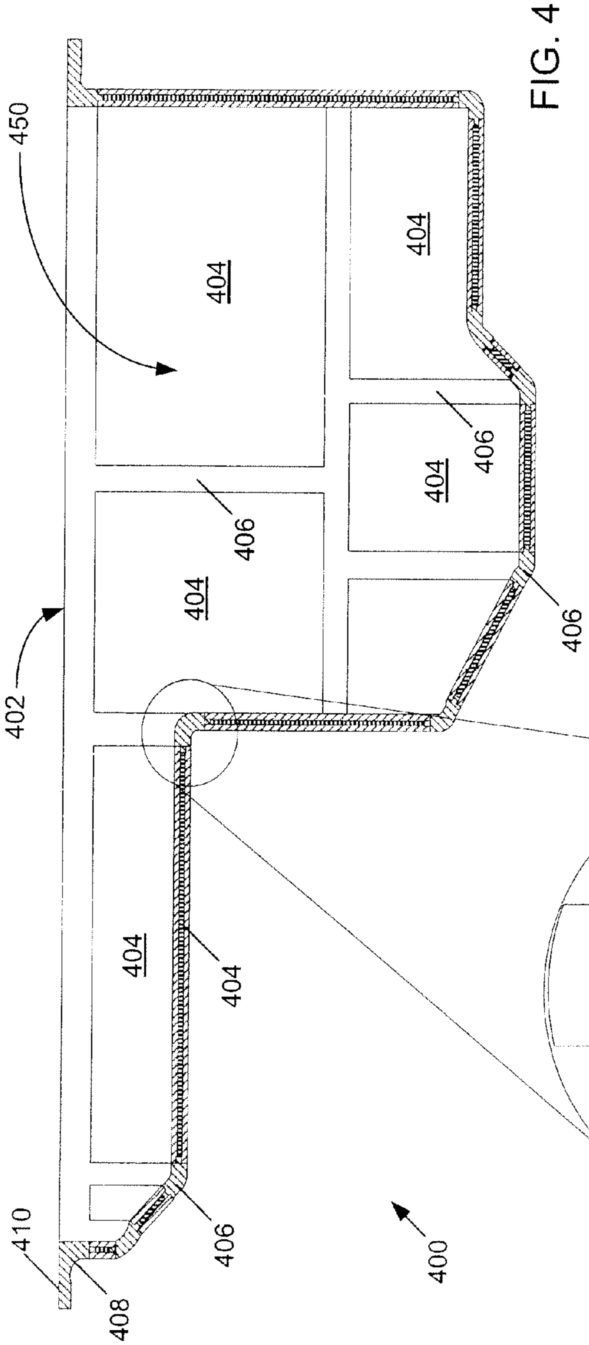
FIG. 4 through FIG. 6 are various views in cross section of an oil pan, and detailed views thereof, in accordance with the invention.

A hybrid oil pan 400 is shown in FIG. 4. The hybrid oil pan 400 includes a skeleton structure or frame 402 with a plurality of panels 404 attached or engaged thereon. The frame 402 may be a single cast, fabricated, or formed metal frame, or may alternatively be assembled out of a plurality of frame pieces that have been operably attached. The frame 402 may be one single piece, or may be made up from a plurality of parts. Additionally, the frame 402 may have interchangeable ribs that may allow the oil pan 400 to take on different shapes to accommodate different engines belonging to the same or a similar family of applications. The frame 402 forms a plurality of ribs 406 that span between the panels 404. The ribs 406 may be used to support and connect the panels 404. An interface rib 408 may form a flange 410 that interfaces and seals with a crankcase of an engine (not shown).

Figure 6:
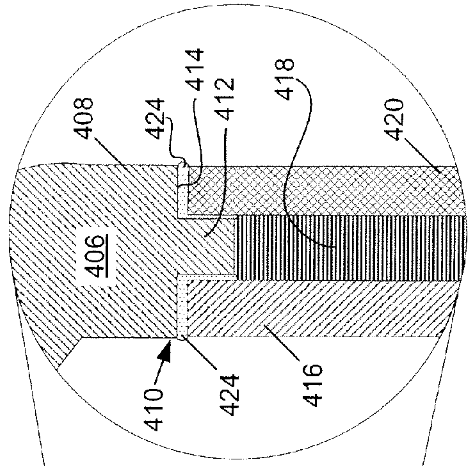
Figure 5:
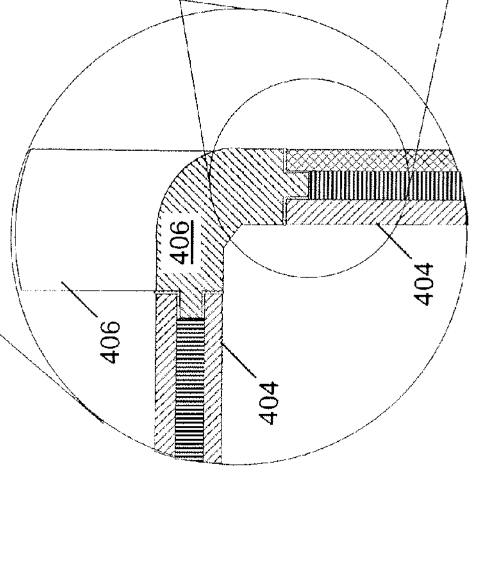

A detail cross-section of an interface between one of the ribs 406 and adjacent panel(s) 404 is shown in FIGS. 5 and 6. Each rib 406 may have a main body section 408 and at least one panel interface section 410. The panel interface section

410 may have a spacer 412 and one or two plate interfaces 414 on one or both sides of it, depending on configuration, as will be discussed further on. The embodiment shown in FIG. 6 has two plate interfaces 414 that are located around the spacer 412.

Each plate 404 may include an external plate 416, a mat 418 that may be connected to the plate 416, and an inner plate 420. When the hybrid oil pan 400 is assembled, the plates 404 may be arranged to have each external plate 416 facing in an outward direction, and conversely each inner plate 420 facing inward and toward an internal reservoir volume 422. The external plate 416, the mat 418, and the inner plate 420 may be connected or bonded to each other to make up each plate 404.

The external plate 416 may be made of any material that has adequate rigidity, such as thermoset plastic, metal, and so forth, but may advantageously be made of aluminum or steel in order to be able to withstand any impacts from road debris. The mat 418 may be made of a flexible material, such as rubber, or polymer foam, or a viscoelastic material, and so forth. The inner plate 420, similar to the external plate 416, may be made of any material that has adequate rigidity, such as thermoset plastic, metal, and so forth, but may advantageously be made of a type of plastic or other material that is lighter than metal yet able to withstand corrosion or dilution in and from engine oil or other substances that may occupy the reservoir volume 422.

When a panel 404 is connected to a rib 406, the external plate may be located adjacent to one of the plate interfaces 414, and the internal plate may be adjacent to another of the plate interfaces 414, the spacer 412 forming therebetween a space that is taken up by the mat 418. An adhesive or sealant 424 may be used to connect, seal, and fill-in any gaps between each of the plates 416 and 420 to each interface 414 of the rib 406. One suitable material for the adhesive or sealant 424 may be a type of silicone rubber having a reduced temperature of vulcanization (RTV). Examples of materials currently available in the market are materials designated as "T-442" or "T-430" available through the Wacker corporation, or a material designated as "3-0105" and available through the Dow Corning Corporation. Other similar materials to the ones presented may be suitable for use, but any material selected for the sealant 424 should advantageously be resistant to extreme temperatures, humidity, and chemical attack by substances commonly found in engine applications.

The hybrid oil pan 400 is advantageous to the operation of an internal combustion engine because it offers the design flexibility for shapeability of a cast oil pan, but also offers noise reduction capabilities similar to an MPM oil pan. The embodiment presented in FIGS. 4-6 may be considered as an example of an "arrested" plate design, because each plate 404 is arrested by the spacer 412 along each rib 406 after assembly of the plates 416 and 420 is complete and the adhesive material 424 has set. The arrested plate design is advantageous for an oil pan or other engine components that are used to support load. In the case of an oil pan, the load supported by the plates is the weight and hydrostatic pressure of engine oil that is collected in the reservoir 422, and possible impact loading by road debris or rocks hitting the oil pan 400 during service. An alternative design for plate retention on a rib that is advantageous for components that do not carry weight may be used, for example, in valve covers.

Figure 7:
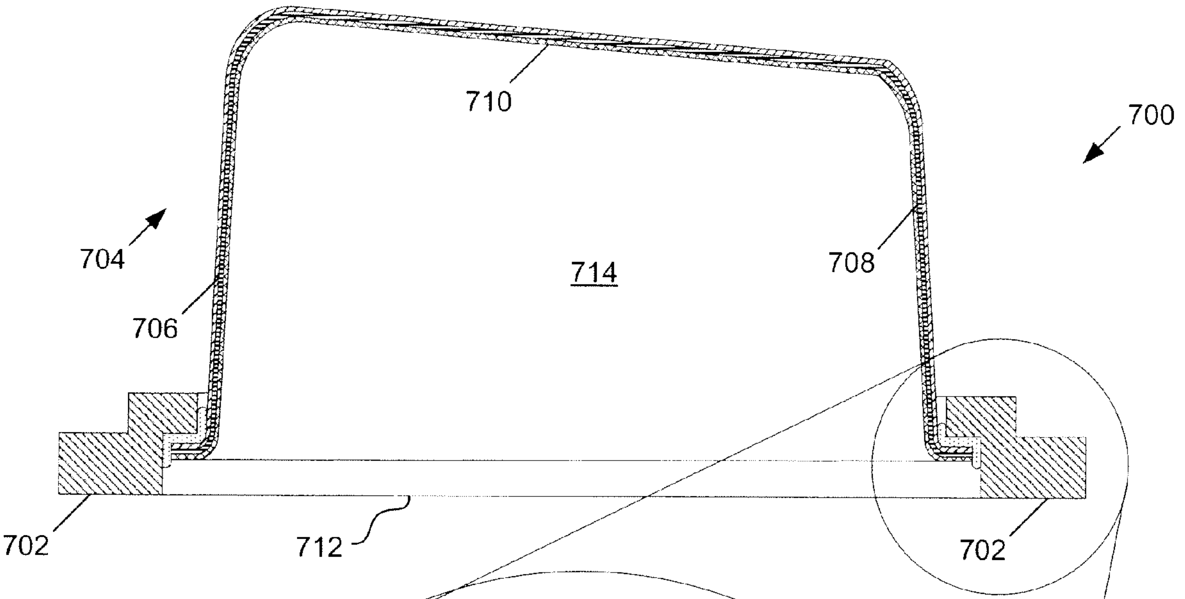
FIG. 7 is a cross section view of a valve cover in accordance with the invention.
Figure 8:
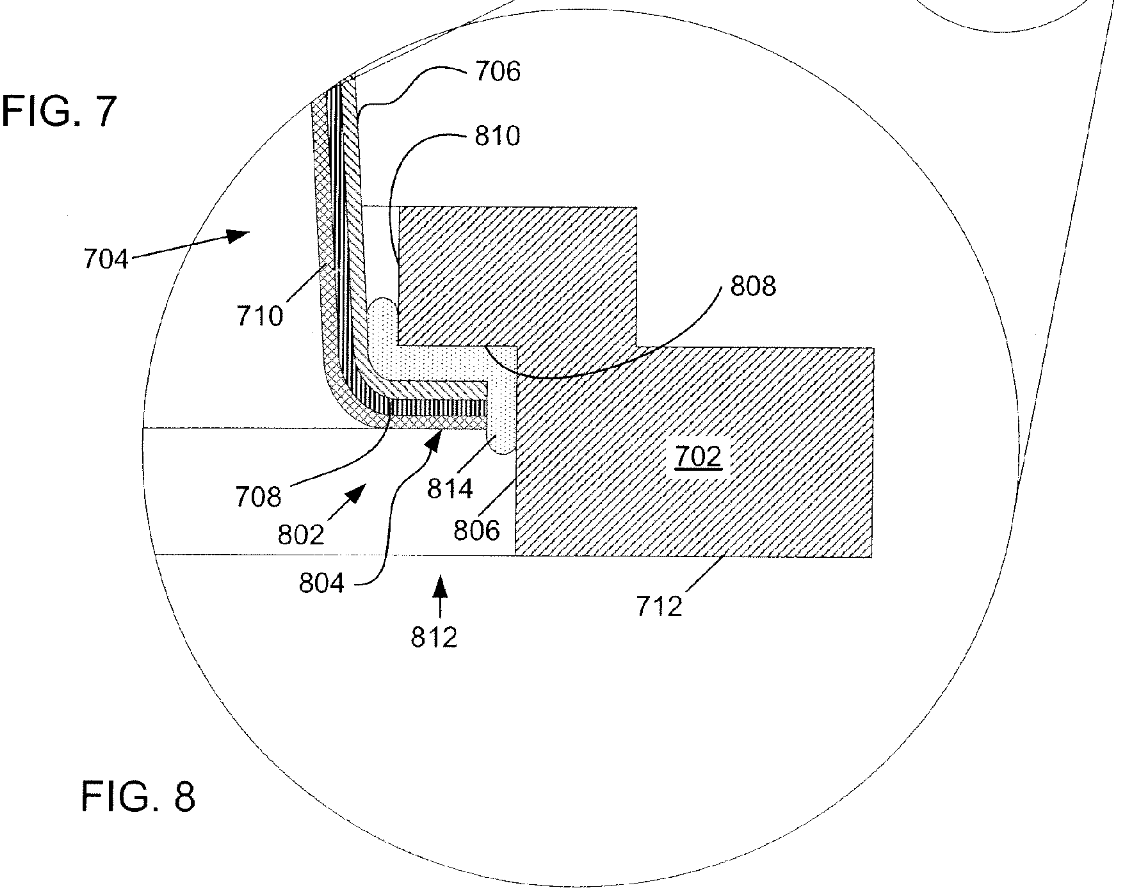
FIG. 8 is a detail view in cross section of the valve cover shown in FIG. 7.

A valve cover 700 having a rib 702 and a formed body panel 704 is shown in cross section in FIG. 7, and a detail view of an intersection between the rib 702 and the formed body panel 704 is shown in FIG. 8. The formed body panel 704 may be a multi-layered material that has noise reduction capabilities. The panel 704 may have an outer layer 706, a middle layer 708, and an inner layer 710. Each of the outer layer 706 and the inner layer 710 may be made of metal, or alternatively may be made of plastic, for example, a thermoset plastic that has been molded into a desired shape. In a preferred embodiment, the outer layer and the inner layer 706 and 710 may be made of a glass-filled nylon material, that is capable of providing acceptable structural rigidity, thermal and chemical resistance, and advantageously low cost and weight. The middle layer 708 may be made of a polymer foam or viscoelastic material that is appropriate for noise dampening. Alternatively, the panel 704 may be an MPM material as described above.

The valve cover 700 has a lower mounting flange 712 for connection to an engine (not shown), and an interior volume 714. The flange 712 may be used to connect the valve cover 700 to a cylinder head of the engine (not shown). The interior volume 714 may be enclosed by the panel 704 and house engine components that operate a valve train of the engine. During operation of an engine, noise from the valve train may be transmitted through the valve cover(s). This noise may advantageously be dampened. Issues similar to those described above that pertain to oil pans also may apply for valve covers. High design flexibility, low weight, and low cost are desirable attributes for an engine valve cover design. Use of the valve cover 700 is advantageous because it offers high design flexibility, low weight, and low cost.

A detailed cross-section of an interface between the panel 704 and the rib 702 is shown in FIG. 8. The panel 704 may have a rim section 802 that may extend around a perimeter of the panel 704. The rim section 802 may be a section of the panel 704 that has been turned outward to form a flat flange 804. The rib 702 may include a spacer surface 806, a panel mounting surface 808, and a panel locating surface 810. The spacer surface 806 and the panel mounting surface 808 may define a mounting channel 812 in the rib 702. The rim section 802 may be located in the channel 812 when the panel 704 is assembled to the rib 702. The locating surface 810 may serve in locating the panel 704 with respect to the rib 702 by allowing a limited motion of the panel 704. The motion of the panel 704 may be limited by the proximity of a lower portion of the outer layer 706 and the locating surface 810.

An adhesive or sealant 814 may be used to connect, seal, and fill-in any gaps between the panel 704 and the rib 702. One suitable material for the adhesive or sealant 814 may be a type of silicone rubber having a reduced temperature of vulcanization (RTV) as the one described above. The sealant 814 may advantageously bond the panel 704 to the rib 702, and may also advantageously isolate the panel 704 from vibration of the rib 702 that may come from the engine during operation.

Figure 9A:
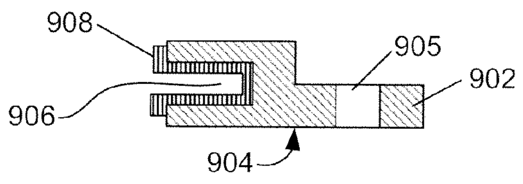
FIGS. 9A through 9D are cross section views of various embodiments for plate-to-rail connection configurations in accordance with the invention.

A number of different connection configurations between panels and ribs may be used. Some configurations in addition to those presented thus far are shown in FIGS. 9A through 9D. A one-piece Y-shaped rail 902 is shown in FIG. 9A. The rail 902 may be configured for a valve cover, and may have a mounting flange 904 which may have a plurality of mounting holes 905 formed therein, one of which is shown in cross-section. The rail 902 may have a continuous channel 906 that is arranged to accept a panel (not shown), as discussed above, retained therein. The channel 906 may have an additional U-shaped isolator 908 that covers any internal surfaces of the channel 906 and arranged to isolate the panel that is located therein. The isolator 908 may advantageously be positioned between the panel and the rail 902 to isolate some vibrations of the rail 902 from transferring to the panel. When the rail 902 is used for a valve cover, the mounting flange 904 may be connected to an engine cylinder head (not shown) as discussed above, and fastened thereto with fasteners (not shown) inserted through the mounting holes 905.

Figure 9B:
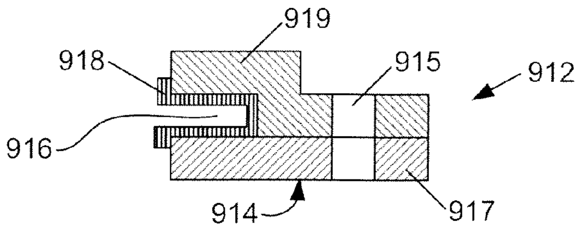

An alternative embodiment, a two-piece Y-shaped rail 912 is shown in FIG. 9B. The rail 912 may be configured for a valve cover, and may have a mounting flange 914 with at least one mounting hole 915 formed therein. The rail 912 may have a continuous channel 916 that is arranged to accept a panel (not shown), as discussed above, and that is defined between a lower portion 917 and an upper portion 919 of the rail 912. The channel 916 may have an additional U-shaped isolator 918 that covers any internal surfaces of the channel 916 and arranged to isolate the panel that is located therein.

Figure 9C:
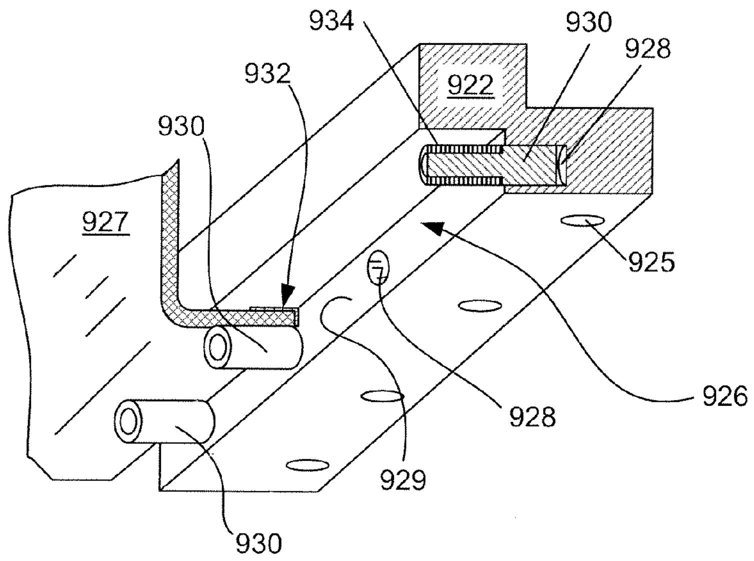

Yet another alternative embodiment of a one piece rail 922 is shown in FIG. 9C. The rail 922 may be configured for a valve cover, and may have a mounting flange 924 which may have mounting holes 925 formed therein. The rail 922 may have a continuous channel 926 that is arranged to accept a panel 927 retained therein. The channel 926 may have a plurality of holes 928 formed on a retention surface 929. A plurality of pegs 930 may be inserted into each of the holes 928 after or before the panel 927 has been assembled. An isolator-material layer 932 may be located between the panel 927 and the rail 922. The layer 932 may be an adhesive or sealant, or alternatively may be a material such as rubber or Viton™ that is inserted between the two components. The purpose of the layer 932 is, primarily, to seal an interface between the panel 927 and the rail 922 and isolate the panel 927 from vibrations of the rail 922.

The pegs 930 may be made of metal, and may be inserted into the holes 928 with a press-fit operation. Alternatively, the pegs 930 may be threaded studs that are assembled into the holes 928 which, in this case, would be threaded as well. The pegs 930 may advantageously be coated with an isolation material layer or collar 934, that may be arranged to be between the panel 927 and the each peg 930 when each peg 930 has been inserted into the hole 928 of the rail 922.

Figure 9D:
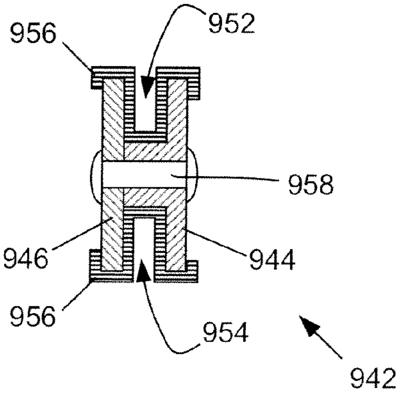

An alternative embodiment of a panel-to-rail retention configuration is shown in FIG. 9D. In this embodiment, a rail assembly 942 includes an inner rail 944 and an outer rail 946. The inner rail 942 and the outer rail 946 may complete and define a first U-shaped channel 952 and a second U-shaped channel 954. Optionally, an isolator 956 may be placed into the channels 952 and 954 to isolate the adjoining panels from the rail assembly 942 as described above. The inner rail 944 may be connected to the outer rail 946 with a rivet 958. Other configurations may be used to retain panels to the rails. The embodiments described herein are representative of some configurations that may be used, but any other configuration that provides for isolative mounting and sealing of panels to rails will be advantageous.

Figure 10:
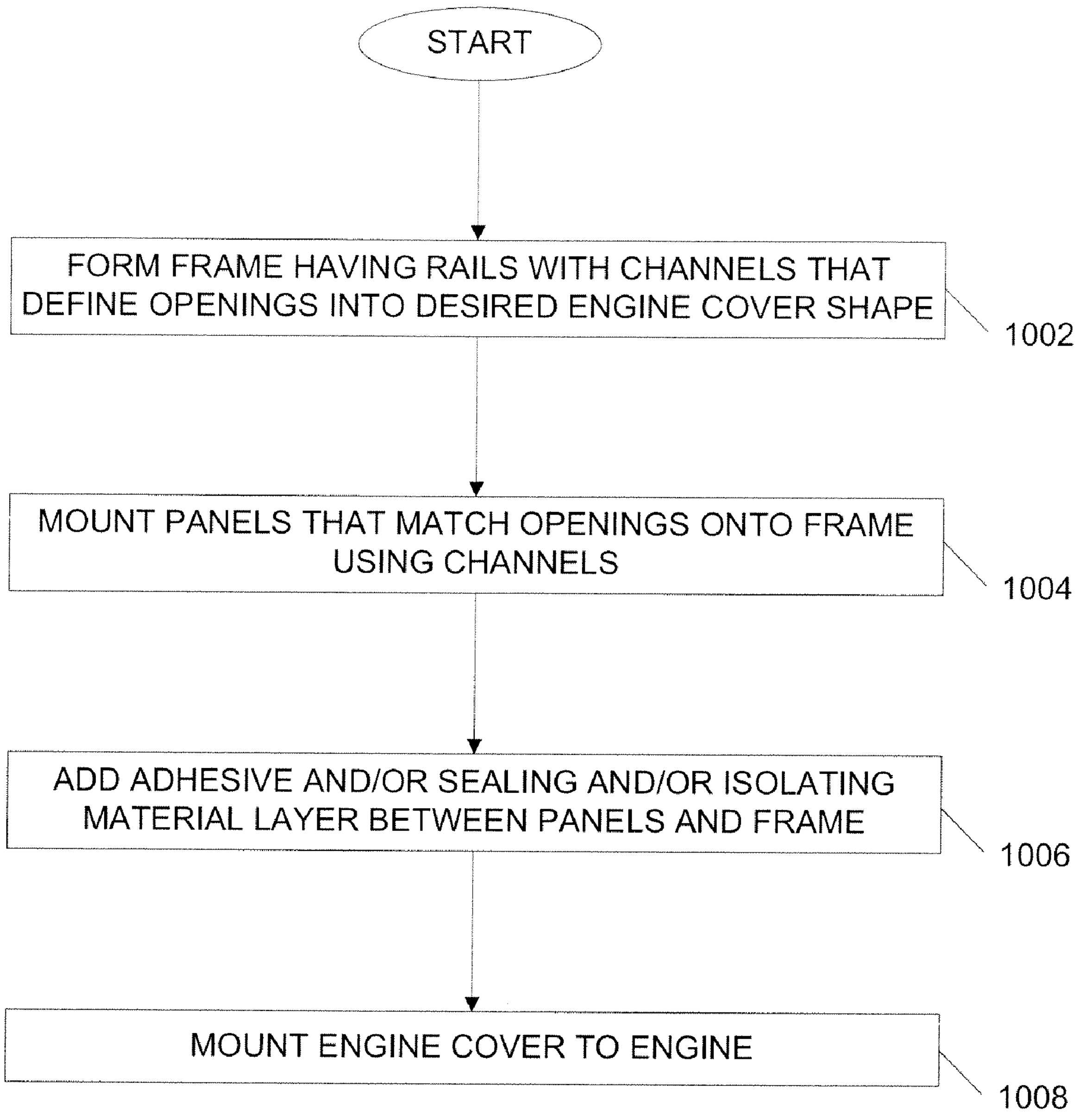
FIG. 10 is a flowchart for a method for manufacturing an engine cover in accordance with the invention.

A flowchart for a method of isolating an engine cover from vibration is shown in FIG. 10. A frame that includes a plurality of rails formed into a desired engine cover outline shape in step 1002. The frame may include a plurality of panel openings, each opening having a channel defined therein. A plurality of panels that are configured to fit into their respective openings in the frame may be mounted into the openings at step 1004. An adhesive and/or sealing and/or isolating layer may be added between each panel and the frame at step 1006. The engine cover may be mounted onto an engine at step 1008. The step of attaching each panel to the frame may include securing the panel to the frame by use of one or more operations that include adhering, riveting, welding, screwing, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An engine cover that contains oil within an engine, comprising:

a skeleton structure that includes a plurality of ribs and at least one opening;

at least one panel configured to fit in the at least one opening, wherein the at least one panel is operably connected to the skeleton structure;

a seal disposed between the at least one panel and the skeleton structure;

wherein the plurality of ribs defines a plurality of channels disposed around the at least one opening, and wherein the panel is disposed in the plurality of channels, wherein said skeleton structure and said at least one panel together form a concave engine cover that is sized and shaped to be coupled to a mounting face of an internal combustion engine, wherein said skeleton structure includes a flange that surrounds said mounting face and is sealingly fastened thereto.

2. The engine cover of claim 1, wherein the engine cover is an oil pan, said oil pan sized and adapted to cover a lower portion of a crankcase of an internal combustion engine by being sealed onto said mounting face.

3. The engine cover of claim 1, wherein the skeleton structure is a single piece.

4. The engine structure of claim 1, wherein the panel includes an outer plate, an inner plate, and a mat disposed between the outer plate and the inner plate.

5. The engine cover of claim 1, further Comprising a sealing material disposed between the at least one panel and the plurality of ribs, and wherein the sealing material is disposed in the plurality of channels.

6. The engine cover of claim 1, wherein the at least one panel has a rim section that forms a flat flange, and wherein the flat flange is disposed in the plurality of channels.

7. The engine cover of claim 1, wherein the plurality of ribs includes at least One y-shaped rail having a u-shaped opening, wherein the at least one panel is disposed in the u-shaped opening, and wherein a u-shaped isolator is disposed in the u-shaped opening between the at least one panel and the y-shaped rail.

8. The engine cover of claim 7, wherein the y-shaped rail includes an inner rail having an open channel and an outer rail, and wherein the u-shaped channel is defined between the open channel and a portion of the outer rail.

9. The engine cover of claim 1, further comprising more than one panels, each of the more than one panels configured to fit into a respective opening.

10. The engine cover of claim 1, wherein the plurality of ribs includes at least one retention surface, wherein a plurality of holes is formed in the retention surface, wherein each of a plurality of pegs is disposed into each of the plurality of holes, and wherein the at least one panel is disposed between the plurality of pegs and the plurality of ribs.

11. The engine cover of claim 10, further comprising an isolation collar disposed on each of the plurality of pegs, and disposed between each of the plurality of pegs and the at least one panel.

12. The engine cover of claim 1, wherein said skeleton structure provides holes for receiving fasteners to fasten said concave engine cover to a mounting face of an internal combustion engine.

13. The engine cover of claim 1, wherein said at least one panel is opaque.

14. The engine cover of claim 1, wherein substantially an entire convex external surface of said at least one panel is metallic.

15. The engine cover of claim 1, wherein said seal is adapted to withstand oil temperatures of an internal combustion engine while sealing between said at least one panel and said skeleton structure.

16. In an internal combustion engine having a head attached to a crankcase, the improvement comprising:

a skeleton structure that includes a plurality of ribs and at least one opening;

at least one panel configured to fit in the at least one opening, wherein the at least one panel is operably connected to the skeleton structure;

a seal disposed between the at least one panel and the skeleton structure;

wherein the plurality of ribs defines a plurality of channels disposed around the at least one opening, and wherein the panel is disposed in the plurality of channels, wherein said skeleton structure and said at least one panel together form a concave engine cover that Is sized and shaped to be coupled to a mounting face of said internal combustion engine, wherein said skeleton structure includes a flange that surrounds said mounting face and is sealingly fastened thereto to contain oil within said internal combustion engine.

17. The improvement according to claim 16, wherein said mounting face is on said crankcase and said engine cover is an oil pan.

* * * * *